Nov. 8, 1955  E. S. GANDRUD  2,723,053
SPREADER FOR GRASS SEED, FERTILIZER AND THE LIKE
Filed Nov. 16, 1953  2 Sheets-Sheet 1
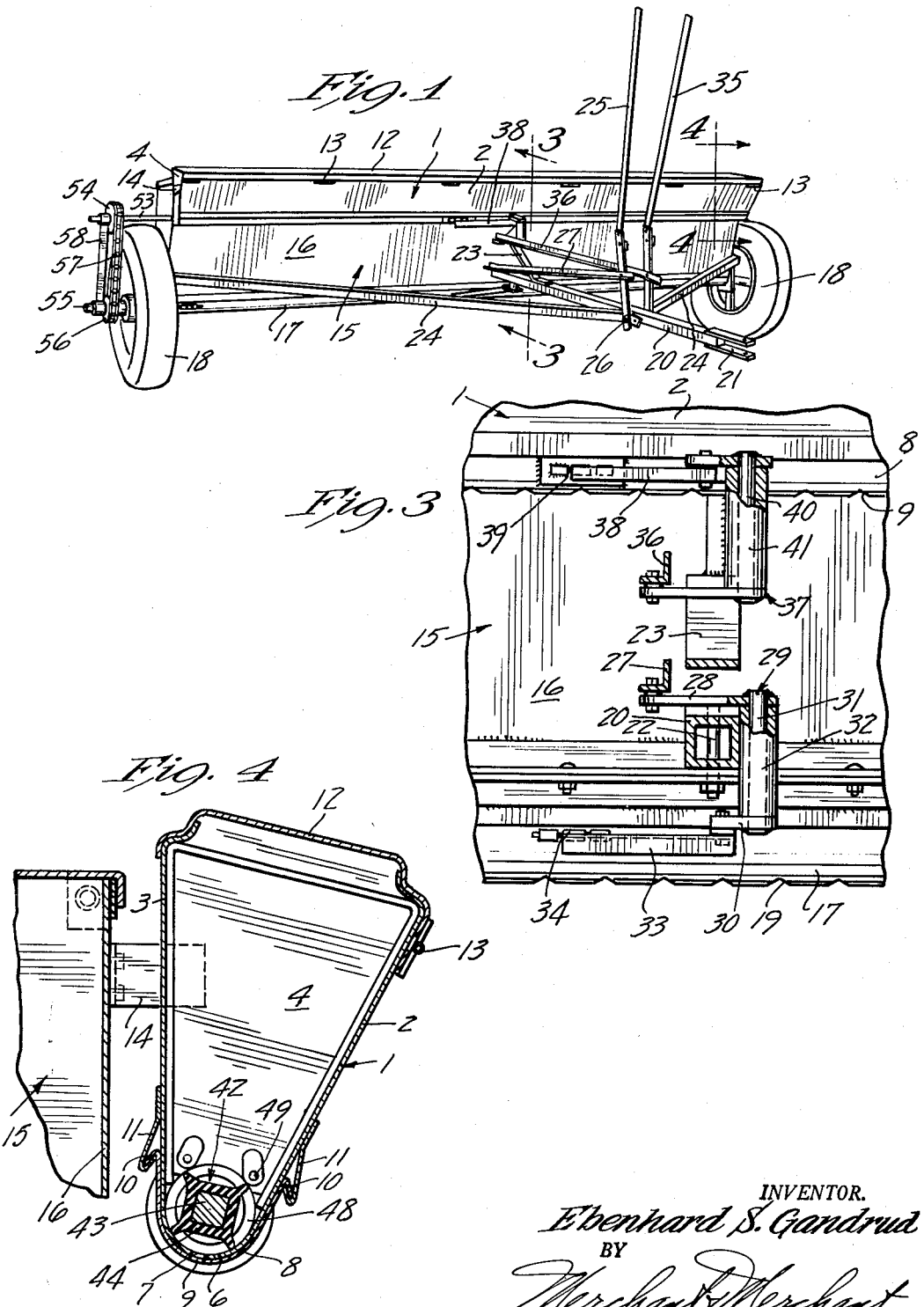
INVENTOR.
Ebenhard S. Gandrud
BY
Merchant & Merchant
ATTORNEYS Nov. 8, 1955  E. S. GANDRUD  2,723,053
SPREADER FOR GRASS SEED, FERTILIZER AND THE LIKE
Filed Nov. 16, 1953  2 Sheets-Sheet 2
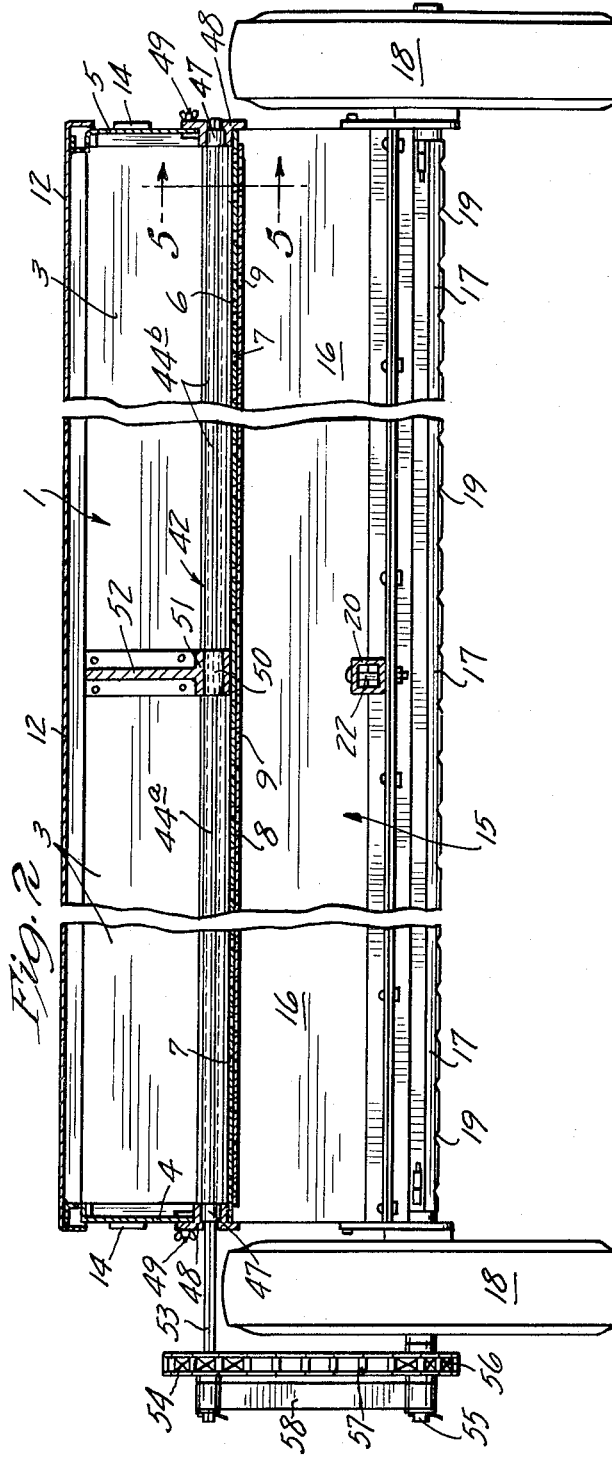
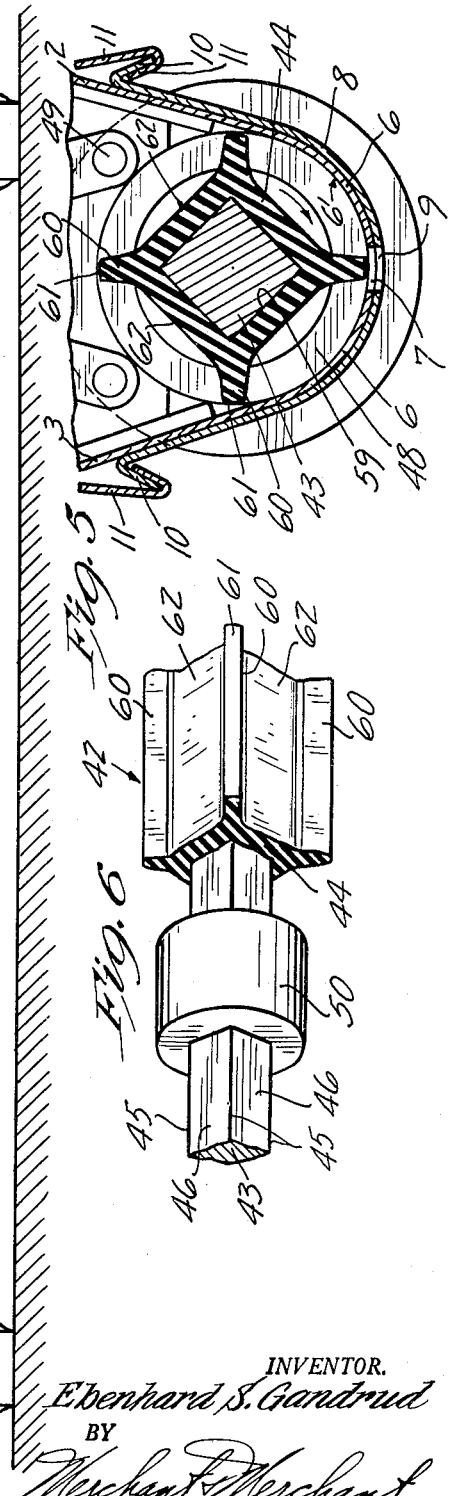
INVENTOR.
Eberhard S. Gandrud
BY
Merchant & Merchant
ATTORNEYS

United States Patent Office 2,723,053
Patented Nov. 8, 1955

2,723,053

SPREADER FOR GRASS SEED, FERTILIZER AND THE LIKE

Ebenhard S. Gandrud, Owatonna, Minn.

Application November 16, 1953, Serial No. 392,097

3 Claims. (Cl. 222—177)

My invention relates generally to broadcast spreaders for seeds, fertilizer, and like granular or powdered material, and more specifically to improvements in feeding rotors for spreaders of the type disclosed and claimed in my prior United States Letters Patent 2,350,107.

In the sowing of seeds of various grains and grasses by mechanical means, it is important that the sowing mechanism does not crush or otherwise injure the seed. Likewise, in the distribution of certain prepared fertilizers in pellet or granular form, the pellets or granules must be protected against crushing or fracture, inasmuch as certain types of said granules or pellets have a soft moist exterior, which, when exposed to the feeding mechanism will adhere to the same and cause the parts thereof to become sticky or gummy, thus interfering with the efficient operation of the spreader mechanism.

An important object of my invention is the provision of a feeding rotor which will effectively break up lumps which have been formed by the granular material to be distributed, and feed the material at a uniform rate without breaking or crushing the individual granules of said material.

Another important object of my invention is the provision of a feeding rotor of the above type which can be used to handle either granular fertilizer or seed interchangeably without damage to the material to be distributed.

Another object of my invention is the provision of a feeding rotor of the above type which, when parts thereof become unduly worn, said worn parts may be quickly and easily removed and replaced at a minimum of cost.

Still another object of my invention is the provision of a feeding rotor comprising a rotary shaft and a flexible resilient feeding element removably mounted thereon, in which the feeding element is positively locked against rotation with respect to the shaft thereof. To this end I provide a shaft which is polygonal in cross section and defines circumferentially spaced longitudinally extended edges and intervening flat faces, and a resilient feeding element having an axial shaft-receiving bore extending longitudinally therethrough and corresponding in transverse size and shape to the cross sectional area of the shaft. Preferably, the feeder element is provided with circumferentially spaced longitudinally extending flexible resilient feeding vanes each being radially aligned with a different edge or corner of the shaft whereby the edges of the shaft will be disposed at the points of greatest radial thickness of the feeding element.

Another object of my invention is the provision of a feeding rotor structure which is relatively simple and inexpensive to produce, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a view in perspective of a seeder and fertilizer spreader built in accordance with my invention;

Fig. 2 is an enlarged fragmentary view in front elevation of the machine of Fig. 1, some parts being broken away and some parts being shown in section;

Fig. 3 is an enlarged fragmentary detail partly in front elevation and partly in section as seen from the line 3—3 of Fig. 1;

Fig. 4 is an enlarged fragmentary vertical section taken substantially on the line 4—4 of Fig. 1;

Fig. 5 is an enlarged fragmentary vertical section taken on the line 5—5 of Fig. 2; and Fig. 6 is a fragmentary view in perspective of the feeding rotor of my invention, some parts being broken away and some parts being shown in section.

Referring with greater detail to the drawings, the numeral 1 indicates in its entirety an elongated open-topped hopper having front and rear walls 2 and 3 respectively end walls 4 and 5 and a cross sectionally arcuate bottom wall portion 6 which, preferably and as shown, is integrally formed with and provides a continuation of the front and rear walls 2 and 3. At its central portion, the bottom wall portion 6 is provided with a plurality of longitudinally spaced discharge openings 7. An elongated cross sectionally U-shaped valve-acting gate 8 underlies the arcuate bottom portion 6 of the hopper and is provided with a plurality of longitudinally spaced openings 9 that are registrable each with a different one of the discharge openings 7 upon movement of the gate 8 longitudinally of the hopper 1. The opposite side edges of the gate 8 are downturned to provide flanges 10 which engage hook-like elements 11 welded or otherwise secured to the front and rear walls 2 and 3 of the hopper 1, see Figs. 4 and 5. An elongated cover 12 is secured by hinges 13 to the open upper end of the hopper 1. When the cover 12 is in its open position, the hopper may be filled with granular or powdered material to be dispensed.

A pair of mounting brackets 14 are rigidly secured one each to each of the end walls 4 and 5 of the hopper 1, and are bolted or otherwise secured to the hopper of a second spreading device indicated in its entirety at 15. The spreading device 15 comprises an elongated hopper 16, an apertured valve-acting gate 17 and a pair of spaced pneumatic tire-equipped ground wheels 18. The spreader 15 is similar to that disclosed in my prior Patent 2,350,107, the valve-acting gate 17 having longitudinally spaced discharge apertures 19 that are registrable with other apertures not shown but similar to the apertures 7 in the hopper 1 upon movement of the gate 17 in opposite directions longitudinally of its cooperating hopper 15.

A drawbar 20 projects forwardly from the central portion of the distributor 15 and is provided at its front end with a yoke or the like 21 which is adapted to be connected to a tractor or other means of propulsion not shown. The drawbar 20 is connected by a nut-equipped bolt or the like 22 and is supported by means of a central diagonally disposed brace member 23 and diagonally disposed brace members 24 which latter are rigidly secured at their outer ends to the opposite ends of the hopper 15 and at their inner ends to the drawbar 20 rearwardly of the yoke 21.

Means for moving the valve-acting gate 17 to effectively open or close the discharge apertures for the hopper 15 comprises a control lever 25 pivotally secured at its lower end to the brace members 24 and drawbar 20 as indicated at 26, a rigid link 27 pivotally secured at one end to the intermediate portion of the control lever 25 and at its other end to one arm 28 of a bell crank 29 comprising the arm 28, a second arm 30 and a shaft 31 to which the inner ends of the arms 28 and 30 are rigidly secured. The shaft portion 31 of the bell crank 29 is journalled in a tubular bearing 32 which is welded or otherwise rigidly secured to the drawbar 20 adjacent its rear end. A rigid link 33 is pivotally secured at one end to the outer end of the bell crank arm 30, and at its other end is operatively connected to the valve-acting gate 17 as indicated at 34. The valve-acting gate 8 for the hopper 1 is provided with similar means for moving the same longitudinally of the hopper 1, said means comprising a control lever 35, a rigid link 36, a bell crank 37 and a relatively short rigid link 38 one end of which is operatively connected to the valve-acting gate 8 as indicated at 39. As shown, the bell crank 37 is similar to the bell crank 29 and includes a central shaft portion 40 which is journalled in a tubular bearing 41 that is welded or otherwise rigidly secured to the hopper 15 and brace member 23. The control handles 25 and 35 are independently movable and located within easy reach of the operator when the drawbar 20 is operatively coupled to a tractor.

For the purpose of effecting a uniform feeding and distribution of granular material such as seed or granular or powdered fertilizer from the hopper 1, I provide novel agitating and feeding means comprising a rotor 42 which includes a rotor shaft 43 and a feeder element 44. The shaft 43 is polygonal in cross section and defines longitudinally extending edges or corners 45 and intervening flat faces 46. At its opposite end portions, the shaft 43 is provided with tubular journal elements 47 that are mounted for rotation in bearing caps or the like 48 that are rigidly secured to the lower end portions of the end walls 4 and 5 by wing nut-equipped bolts or the like 49. A central tubular journal 50 is mounted for rotation in a bearing 51 formed as part of a central brace member 52 within the hopper 1. With reference to Figs. 4 and 5 it will be seen that the shaft 43 is mounted for rotation on the axis of the arcuate bottom portion 6 of the hopper 1 for a purpose which will hereinafter become apparent. With reference to Figs. 1 and 2 it will be seen that the shaft 43 projects axially outwardly of the hopper end wall 4 to provide an extension 53 on which is mounted a sprocket wheel 54. A wheel shaft 55 extends axially outwardly from the ground wheel 18 and has rigidly mounted thereon a sprocket wheel 56 over which and the sprocket wheel 54 runs an endless link chain 57 which imparts rotation to the rotor shaft 43 upon rotation of the associated ground wheel 18. A rigid bearing strut 58 has its lower end journalled on the shaft 55 and its upper end journalled on the extreme end of the shaft extension 53 whereby to prevent bending of the extended shaft portion 53 when the same is under feeding load. The rotor shaft 43 may have any desired number of corner edges 45 and intervening flat faces 46, but preferably, and as shown is cross sectionally square.

With reference to Fig. 2 it will be seen that the feeder element 44 comprises a pair of feeder element sections 44a and 44b one on either side of the central bearing 51. The feeder element 44 may be made from any flexible resilient material but is preferably made from relatively soft rubber and is formed by extrusion rather than being cast in a mold. The feeding element 44 is formed to provide an axial shaft-receiving bore 59 which extends axially therethrough. The bore 59 corresponds in transverse size and shape to the cross sectional area of the shaft 43 and is slidably mounted thereon. The feeder element 44 further includes a plurality of circumferentially spaced feeding vanes 60 which extend longitudinally thereof and which project radially outwardly therefrom. It will be seen by reference to Figs. 4, 5 and 6 that the feeding vanes 60 are each radially aligned with a different edge or corner 45 of the shaft 43, and are each of a radial height to terminate in closely spaced relation to the inner surface 6' of the arcuate bottom portion 6 of the hopper 1. Preferably, the outer ends of the feeding vanes 60 terminate in arcuate surface portions 61 which define arcs of a circle having a radius only slightly less than that of the inner surface 6' of the hopper bottom portion 6. In practice, I have found that best feeding results are accomplished with a running clearance between the arcuate outer surfaces 61 of the feeding vanes 6 and the inner surface 6' of the hopper bottom portion 6 of approximately .005 inch. Preferably, the feeder element 44 is formed with a relatively flat outer surface portion 62 between adjacent pairs of the feeding vanes 60. It will be further noted that the circumferential length of the hopper bottom portion 6 is greater than the circumferential distance between the outer ends of adjacent vanes 60. With this arrangement, pockets are formed between the feeding rotor 42 and the underlying hopper bottom portion 6 whereby uniform feeding of the material is assured. Furthermore, the relatively soft resilient flexibility of the feeding vanes 60 assure feeding of the material without danger of crushing or otherwise injuring individual seeds or granules of material without overly reducing the ability of the rotor in effectively reducing lumps which may have formed by granules adhering together within the hopper.

The arrangement above described and shown in the drawings whereby the corners or edges 45 of the shaft 43 underlie the feeding vanes 60 insure against circumferential slippage between the shaft 43 and the feeder element 44 mounted thereon when the feeding rotor 42 is subject to extreme load. With the construction above described, the greatest cross sectional dimensions of the shaft 43 engage the portions of the feeder element 44 at its points of greatest lateral dimension and of consequent greatest resistance to stretching. Furthermore, when the shaft 43 is rotated, the resistance of the material in the hopper tends to cause flexing of the feeding vanes 60 in a direction opposite to the direction of rotation of the shaft 43 thereby tending to compress the material of the feeder element angularly inwardly toward the flat faces 46 of the shaft 43. This action tends to increase the frictional contact between the shaft 43 and the feeder element 44 and positively prevents any slippage therebetween. The angular disposition of the shaft 43 with respect to the feeder element 44 permits the feeder element to be made from a softer more resilient rubber than would be otherwise effective if the vanes 60 were in overlying relationship to the flat faces 46 instead of the edges 45 as shown. If such an arrangement were used, a load applied to the vanes would tend to stretch the material of the feeder element between the vanes and thus cause the feeder element to slip on the shaft.

A feeding rotor not shown may be assumed to be contained within the hopper 15 and may if desired be of the same construction as the feeding rotor 42 if the material dispensed from the hopper 15 is of the nature to necessitate the use of such a rotor. Otherwise, this feeding or agitating rotor may be similar to that shown and described in my prior patent above identified. Driving connections for the rotor in the hopper 15 are clearly shown and described in said prior patent.

My invention has been thoroughly tested and found to be completely satisfactory for the accomplishment of the objectives set forth; and while I have shown and described a commercial embodiment of my novel feeding rotor and spreader construction, it will be understood that the same is capable of modification without departure from the spirit and scope of the invention as defined in the claims.

What I claim is:

1. In a device for spreading granular material, said device comprising a hopper having front and rear walls and end walls and an arcuate bottom portion, and structure including ground wheels for supporting the hopper in spaced relation to the ground, said arcuate bottom portion having openings therein for the discharge of material from the hopper; a feeding rotor comprising a shaft journalled in said hopper on the axis of said arcuate bottom portion and operatively coupled to one of said ground wheels for common rotation therewith, said shaft within said hopper being polygonal in cross section and defining circumferentially spaced longitudinally extended edges and intervening flat faces, and an elongated flexible resilient feeder element having an axial shaft-receiving bore extending longitudinally therethrough, said bore corresponding in transverse size and shape to the cross sectional area of the shaft, said feeder element being mounted on said shaft within the hopper and having circumferentially spaced longitudinally extending flexible resilient feeding vanes, each of said vanes being radially aligned with a different edge of said shaft and each being of a radial height to terminate in closely spaced relation to the inside surface of the arcuate bottom portion of the hopper under rotation of said shaft, said feeder element defining flat outer surfaces extending laterally between the adjacent feeding vanes thereof, each of said flat surfaces being parallel to the adjacent underlying flat face of said shaft.

2. In a device for spreading granular materials, a hopper having front and rear walls and end walls and an arcuate bottom portion connecting the front and rear walls, said arcuate bottom portion having longitudinally spaced openings therein for the discharge of material from the hopper, structure including ground wheels for supporting the hopper in spaced relation to the ground, a feeding rotor comprising a shaft journalled in said hopper on the axis of said arcuate bottom portion, means operatively coupling said shaft to one of said ground wheels for common rotation therewith, said shaft within said hopper being polygonal in cross section and defining circumferentially spaced longitudinally extended edges and intervening flat faces, and an elongated flexible resilient feeder element having an axial shaft-receiving bore extending longitudinally therethrough, said bore corresponding in transverse size and shape to the cross sectional area of the shaft, said feeder element being axially slidably mounted on said shaft within the hopper and having circumferentially spaced longitudinally extending flexible resilient feeding vanes, each of said vanes being radially aligned with a different edge of said shaft and each being of a radial height to terminate in closely spaced relation to the inside surface of the arcuate bottom portion of the hopper under rotation of said shaft, the arcuate bottom portion of said hopper having a circumferential length greater than the circumferential distance between the outer edges of adjacent vanes on said feeding rotor.

3. In a device for spreading granular material, an elongated hopper having front and rear walls and end walls and an arcuate bottom portion connecting the front and rear walls, structure including ground wheels at opposite ends of said hopper for supporting the same in spaced relation to the ground, said arcuate portion having longitudinally spaced openings therein for the discharge of material from the hopper, a feeding rotor comprising a cross sectionally square shaft journalled in said hopper on the axis of said arcuate bottom portion, means operatively coupling said shaft to one of said ground wheels for common rotation therewith, said shaft within the hopper defining circumferentially spaced longitudinally extended edges and intervening flat faces, and an elongated rubber-like feeder element having an axial shaft-receiving square bore extending longitudinally therethrough, said bore corresponding in transverse size to the cross sectional area of the shaft, said feeder element being axially slidably mounted on said shaft within the hopper and having circumferentially spaced longitudinally extending flexible resilient feeding vanes integrally formed therewith, each of said vanes being radially aligned with a different edge of said shaft and each being of a radial height to terminate in closely spaced relation to the inside surface of the arcuate bottom portion of said hopper under rotation of said shaft, the arcuate bottom portion of said hopper having a circumferential length greater than the circumferential distance between the outer edges of adjacent vanes on said feeding rotor, said feeder element defining flat outer surfaces extending laterally between the adjacent feeding vanes thereof, and longitudinally the entire length of said element, each of said outer surfaces being parallel to the adjacent underlying flat surface of said shaft.

References Cited in the file of this patent
UNITED STATES PATENTS

| | | |
|---|---|---|
| 175,065 | Garrett | Mar. 21, 1876 |
| 2,350,107 | Gandrud | May 30, 1944 |
| 2,475,381 | Erickson | July 5, 1949 |
| 2,603,383 | Wilson | July 15, 1952 |